United States Patent
Peng et al.

(10) Patent No.: US 9,552,625 B2
(45) Date of Patent: Jan. 24, 2017

(54) METHOD FOR IMAGE ENHANCEMENT, IMAGE PROCESSING APPARATUS AND COMPUTER READABLE MEDIUM USING THE SAME

(71) Applicant: National Chiao Tung University, Hsinchu (TW)

(72) Inventors: Kuo-Shiuan Peng, Hsinchu (TW); Fang-Cheng Lin, Taichung (TW); Yi-Pai Huang, Hsinchu County (TW); Han-Ping D. Shieh, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 221 days.

(21) Appl. No.: 14/522,595

(22) Filed: Oct. 24, 2014

(65) Prior Publication Data

US 2015/0348234 A1  Dec. 3, 2015

(30) Foreign Application Priority Data

May 30, 2014  (TW) .............................. 103119050 A

(51) Int. Cl.
*G06K 9/52*  (2006.01)
*G06T 3/40*  (2006.01)

(52) U.S. Cl.
CPC .............. *G06T 3/4053* (2013.01); *G06K 9/52* (2013.01)

(58) Field of Classification Search
None
See application file for complete search history.

(56) References Cited

U.S. PATENT DOCUMENTS 8,284,314 B2  10/2012  Wallace et al.
8,417,030 B2  4/2013  Peng et al.
(Continued)

FOREIGN PATENT DOCUMENTS

CN  103279933 A  * 9/2013
EP  2662824 A1 * 11/2013  ............. G06T 5/003

OTHER PUBLICATIONS

Daniel Glasner, et al., "Super-Resolution from a Single Image," Computer Vision, 2009 IEEE 12th International Conference on, Sep. 29, 2009-Oct. 2, 2009, pp. 349-356.
(Continued)

*Primary Examiner* — Tsung-Yin Tsai
(74) *Attorney, Agent, or Firm* — Jianq Chyun IP Office

(57) ABSTRACT

A method, image processing apparatus, and computer readable medium for image enhancement are provided. In the method, a low-resolution image is received and upscaled to generate an upscaled image having first pixels. Edge detection is performed on the upscaled image to obtain edge information of the first pixels. Each piece of the edge information includes an edge direction and an edge intensity, and each of the edge directions includes a horizontal and vertical component having a constant summation. A non-edge region of the upscaled image is enhanced to generate a high-resolution detail image; based on unsharp masking sharpening methods, an edge region of the low-passed upscaled image is enhanced according to the horizontal and vertical components of the edge directions to generate a high-resolution edge image. Image fusion is performed on the high-resolution edge image and the high-resolution detail image according to the edge intensities to generate a super-resolution image.

13 Claims, 3 Drawing Sheets

(56) References Cited

U.S. PATENT DOCUMENTS

| | | | |
|---|---|---|---|
| 8,526,765 B2 | 9/2013 | Sakaguchi et al. | |
| 8,538,203 B2* | 9/2013 | Pan | G06T 3/4007 348/240.99 |
| 9,064,476 B2* | 6/2015 | Sun | G09G 5/391 |
| 2006/0279585 A1* | 12/2006 | Milanfar | G06T 3/4015 345/694 |
| 2010/0074548 A1 | 3/2010 | Pan et al. | |
| 2010/0189373 A1 | 7/2010 | Ayzenberg | |
| 2012/0147205 A1* | 6/2012 | Lelescu | H04N 13/0029 348/218.1 |
| 2013/0177242 A1* | 7/2013 | Adams, Jr. | G06T 3/403 382/167 |
| 2014/0177706 A1* | 6/2014 | Fernandes | H04N 19/463 375/240.03 |
| 2014/0354886 A1* | 12/2014 | Michaeli | H04N 1/4092 348/607 |
| 2015/0093015 A1* | 4/2015 | Liang | G06K 9/6267 382/154 |
| 2015/0104116 A1* | 4/2015 | Salvador | G06T 3/4053 382/300 |
| 2015/0235345 A1* | 8/2015 | Liu | G06T 3/4076 382/167 |

OTHER PUBLICATIONS

He He, et al., "Single Image Super-Resolution using Gaussian Process Regression," Computer Vision and Pattern Recognition (CVPR), 2011 IEEE Conference on, Jun. 20-25, 2011, pp. 449-456.

Shengyang Dai, et al., "Bilateral Back-Projection for Single Image Super Resolution," Multimedia and Expo, 2007 IEEE International Conference on, Jul. 2-5, 2007, pp. 1039-1042.

Andrea Polesel, et al., "Image Enhancement via Adaptive Unsharp Masking," Image Processing, IEEE Transactions on, vol. 9, Issue 3, Mar. 2000, pp. 505-510.

"Office Action of Taiwan Counterpart Application", issued on Mar. 21, 2016, p. 1-p. 4.

* cited by examiner

METHOD FOR IMAGE ENHANCEMENT, IMAGE PROCESSING APPARATUS AND COMPUTER READABLE MEDIUM USING THE SAME

CROSS-REFERENCE TO RELATED APPLICATION

This application claims the priority benefit of Taiwan application serial no. 103119050, filed on May 30, 2014. The entirety of the above-mentioned patent application is hereby incorporated by reference herein and made a part of this specification.

BACKGROUND OF THE INVENTION

1. Field of the Invention

The invention generally relates to an image processing technique, in particular, to a method, an image processing apparatus and a computer readable medium for image enhancement.

2. Description of Related Art

Along with the fast development in LCD-TVs, ultra-high definition (UHD) LCD-TVs have become emerging technologies mainly due to advantages such as high contrast, high brightness, high color saturation, and wide viewing angles. UHD LCD-TVs provide tremendous market potential for large-size LCD panels and deliver luxurious visual experiences by a display technology capable of exceeding the limits of human perception.

However, since UHD image capturing apparatuses are still underdeveloped, super resolution images are not commonly available. The so-called "super-resolution image" may be obtained by upscaling an image and compensating for the loss of high-frequency information so that the upscaled image may still preserve the clarity or even provide more details than the original image. Such technique is widely-adopted for TV signal image processing to convert low-resolution original signals to images with high quality.

The prior art methods may use a database as a reference source for a high-resolution image or a complex iteration process such as self-example based method to generate a super-resolution image. Such approaches may create significant results, and yet may not be feasible for real-time implementation on a video display chip. On the other hand, a super-resolution image with local contrast enhancement may be generated by leveraging some conventional image sharpening methods, where in particular, the unsharp masking sharpening method with high efficiency and low complexity is suited for real-time video application. Nevertheless, the generated image may be degraded due to ringing or jaggy artifacts occurring during a conventional unsharp masking sharpening process.

SUMMARY OF THE INVENTION

Accordingly, the invention is directed to a method, an image processing apparatus and a computer readable medium for image enhancement, which is capable of generating a super-resolution image in real-time with low-cost architectures by leveraging an edge detection technique and an unsharp masking sharpening technique.

The invention is directed to a method for image enhancement, adapted to an image processing apparatus. The method includes the following steps: receiving a low-resolution image and upscaling the low-resolution image so as to generate an upscaled image, where the upscaled image includes a plurality of first pixels; performing edge detection on the upscaled image so as to obtain edge information of each of the first pixels, where the edge information of each of the first pixels includes an edge direction and an edge intensity, each of the edge directions includes a horizontal component and a vertical component, and a summation of the horizontal component and the vertical component of each of the edge directions is a constant; performing low-pass filtering on the upscaled image by using a low-pass filter so as to generate a low-passed upscaled image, and enhancing an edge region of the low-passed upscaled image according to the horizontal component and the vertical component of each of the edge directions by leveraging a one-dimensional horizontal unsharp masking sharpening method and a one-dimensional vertical unsharp masking sharpening method so as to generate a high-resolution edge image; enhancing a non-edge region of the upscaled image by leveraging a two-dimensional unsharp masking sharpening method so as to generate a high-resolution detail image; and performing image fusion on the high-resolution edge image and the high-resolution detail image according to each of the edge intensities so as to generate a super-resolution image.

According to an embodiment of the invention, the step of upscaling the low-resolution image so as to generate the upscaled image includes: interpolating and upscaling the low-resolution image by leveraging a bicubic interpolation method so as to generate the upscaled image.

According to an embodiment of the invention, the step of performing edge detection on the upscaled image so as to obtain the edge information of each of the first pixels includes: calculating a horizontal gradient and a vertical gradient of each of the first pixels by using an edge-detection filter; calculating and normalizing an absolute summation of the horizontal gradient and the vertical gradient of each of the first pixels respectively so as to obtain the edge intensity of each of the first pixels; and calculating and normalizing an absolute ratio corresponding to the horizontal gradient and the vertical gradient of each of the first pixels so as to obtain the horizontal component and the vertical component of the edge direction of each of the first pixels.

According to an embodiment of the invention, after the step of calculating and normalizing the absolute ratio corresponding to the horizontal gradient and the vertical gradient of each of the first pixels so as to obtain the horizontal component and the vertical component of the edge direction of each of the first pixels, the method further includes: performing low-pass filtering on the horizontal component of the edge direction of each of the first pixels by using another low-pass filter so as to generate a low-pass horizontal component of the edge direction of each of the first pixels; obtaining a low-pass vertical component of the edge direction of each of the first pixels according to the low-pass horizontal component of the edge direction of each of the first pixels; and setting the low-pass horizontal component and the low-pass vertical component of the edge direction of each of the first pixels respectively as the horizontal component and the vertical component of the edge direction of each of the first pixels.

According to an embodiment of the invention, the step of enhancing the edge region of the low-passed upscaled image according to the horizontal component and the vertical component of each of the edge directions by leveraging the one-dimensional horizontal unsharp masking sharpening method and the one-dimensional vertical unsharp masking sharpening method so as to generate the high-resolution edge image includes: setting the horizontal component of each of the edge directions as a horizontal weight corresponding to a horizontal unsharp mask; setting the vertical component of each of the edge directions as a vertical weight corresponding to a vertical unsharp mask; enhancing the edge region of the low-passed upscaled image according to the horizontal unsharp mask, the vertical unsharp mask, each of the horizontal weights, and each of the vertical weights so as to generate an edge-enhanced image; and performing image clipping on the edge-enhanced image according to each of the edge intensities so as to generate the high-resolution edge image.

According to an embodiment of the invention, the step of performing image fusion on the high-resolution edge image and the high-resolution detail image according to each of the edge intensities so as to generate the super-resolution image includes: setting each of the edge intensities as an edge intensity weight corresponding to the high-resolution edge image; obtaining a corresponding non-edge intensity weight according to each of the edge intensity weights; and performing image fusion on the high-resolution edge image and the high-resolution detail image by an fusion ratio of each of the edge intensity weight to the corresponding non-edge intensity weight so as to generate the super-resolution image.

The invention is directed to an image processing apparatus including a storage unit and a processing unit, where the processing unit is coupled to the storage unit. The storage unit is configured to store a plurality of instructions. The processing unit is configured to access and execute the instructions for: receiving a low-resolution image and upscaling the low-resolution image so as to generate an upscaled image, where the upscaled image includes a plurality of first pixels; performing edge detection on the upscaled image so as to obtain edge information of each of the first pixels, where the edge information of each of the first pixels includes an edge direction and an edge intensity, each of the edge directions includes a horizontal component and a vertical component, and a summation of the horizontal component and the vertical component of each of the edge directions is a constant; performing low-pass filtering on the upscaled image by using a low-pass filter so as to generate a low-passed upscaled image, and enhancing an edge region of the low-passed upscaled image according to the horizontal component and the vertical component of each of the edge directions by leveraging a one-dimensional horizontal unsharp masking sharpening method and a one-dimensional vertical unsharp masking sharpening method so as to generate a high-resolution edge image; enhancing a non-edge region of the upscaled image by leveraging a two-dimensional unsharp masking sharpening method so as to generate a high-resolution detail image; and performing image fusion on the high-resolution edge image and the high-resolution detail image according to each of the edge intensities so as to generate a super-resolution image.

According to an embodiment of the invention, the processing unit executes the instruction for upscaling the low-resolution image so as to generate the upscaled image including: interpolating and upscaling the low-resolution image by leveraging a bicubic interpolation method so as to generate the upscaled image.

According to an embodiment of the invention, the processing unit executes the instruction for performing edge detection on the upscaled image so as to obtain the edge information of each of the first pixels includes: calculating a horizontal gradient and a vertical gradient of each of the first pixels by using an edge-detection filter; calculating and normalizing an absolute summation of the horizontal gradient and the vertical gradient of each of the first pixels respectively so as to obtain the edge intensity of each of the first pixels; and calculating and normalizing an absolute ratio corresponding to the horizontal gradient and the vertical gradient of each of the first pixels so as to obtain the horizontal component and the vertical component of the edge direction of each of the first pixels.

According to an embodiment of the invention, after the processing unit executes the instruction for calculating and normalizing the absolute ratio corresponding to the horizontal gradient and the vertical gradient of each of the first pixels so as to obtain the horizontal component and the vertical component of the edge direction of each of the first pixels, the processing unit further executes another instruction for: performing low-pass filtering on the horizontal component of the edge direction of each of the first pixels by using another low-pass filter so as to generate a low-pass horizontal component of the edge direction of each of the first pixels; obtaining a low-pass vertical component of the edge direction of each of the first pixels according to the low-pass horizontal component of the edge direction of each of the first pixels; and setting the low-pass horizontal component and the low-pass vertical component of the edge direction of each of the first pixels respectively as the horizontal component and the vertical component of the edge direction of each of the first pixels.

According to an embodiment of the invention, the processing unit executes the instruction for enhancing the edge region of the low-passed upscaled image according to the horizontal component and the vertical component of each of the edge directions by leveraging the one-dimensional horizontal unsharp masking sharpening method and the one-dimensional vertical unsharp masking sharpening method so as to generate the high-resolution edge image includes: setting the horizontal component of each of the edge directions as a horizontal weight corresponding to a horizontal unsharp mask; setting the vertical component of each of the edge directions as a vertical weight corresponding to a vertical unsharp mask; enhancing the edge region of the low-passed upscaled image according to the horizontal unsharp mask, the vertical unsharp mask, each of the horizontal weights, and each of the vertical weights so as to generate an edge-enhanced image; and performing image clipping on the edge-enhanced image according to each of the edge intensities so as to generate the high-resolution edge image.

According to an embodiment of the invention, the processing unit executes the instruction for performing image fusion on the high-resolution edge image and the high-resolution detail image according to each of the edge intensities so as to generate the super-resolution image includes: setting each of the edge intensities as an edge intensity weight corresponding to the high-resolution edge image; obtaining a corresponding non-edge intensity weight according to each of the edge intensity weights; and performing image fusion on the high-resolution edge image and the high-resolution detail image by an fusion ratio of each of the edge intensity weight to the corresponding non-edge intensity weight so as to generate the super-resolution image.

The invention is also directed to a non-transitory computer readable medium recording programs to be loaded into an image processing apparatus to perform steps of: receiving a low-resolution image and upscaling the low-resolution image so as to generate an upscaled image, where the upscaled image includes a plurality of first pixels; performing edge detection on the upscaled image so as to obtain edge information of each of the first pixels, where the edge information of each of the first pixels includes an edge direction and an edge intensity, each of the edge directions includes a horizontal component and a vertical component, and a summation of the horizontal component and the vertical component of each of the edge directions is a constant; performing low-pass filtering on the upscaled image by using a low-pass filter so as to generate a low-passed upscaled image, and enhancing an edge region of the low-passed upscaled image according to the horizontal component and the vertical component of each of the edge directions by leveraging a one-dimensional horizontal unsharp masking sharpening method and a one-dimensional vertical unsharp masking sharpening method so as to generate a high-resolution edge image; enhancing a non-edge region of the upscaled image by leveraging a two-dimensional unsharp masking sharpening method so as to generate a high-resolution detail image; and performing image fusion on the high-resolution edge image and the high-resolution detail image according to each of the edge intensities so as to generate a super-resolution image.

In summary, the method, image processing apparatus, and computer readable medium for image enhancement provided in the invention use complete normalized edge direction and edge intensity information obtained from edge detection to generate a stable result. Horizontal and vertical high-pass filters along with the complete edge direction information may be used on an edge region for reproducing clear edges, and thus the issue of artifacts and jaggy on the edge region may be solved. A non-directional high-pass filter may be used on a non-edge region of the image for obtaining high-frequency information, and thus the high-frequency details of the upscaled image may be effectively enhanced in vivid details while detail artifacts or distortion may be prevented. A super-resolution image may be generated accordingly. Moreover, since the invention is implemented by a high-pass filter adopted as a kernel, high-frequency components in an image may be obtained in real-time without iterations and may be adjusted adaptively in terms of flexibility. Hence, while maintaining a single image without additional frame buffer, the applicability of the image enhancement technique proposed in the invention is increased in practical application especially for consumer electronic products such as UHD LCD display integrated with a real-time chip.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
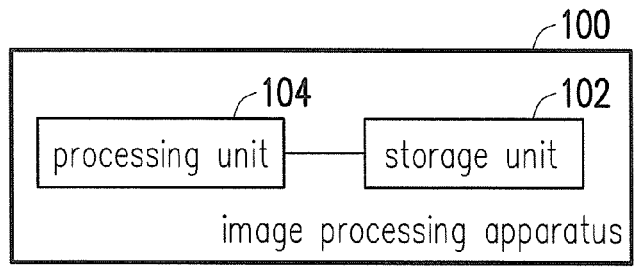
FIG. 1 illustrates a block diagram of an image processing apparatus according to an embodiment of the invention.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the invention.

FIG. 1 illustrates a block diagram of an image processing apparatus according to an embodiment of the invention. It should, however, be noted that this is merely an illustrative example and the invention is not limited in this regard. All components of the image processing apparatus and their configurations are first introduced in FIG. 1. The detailed functionalities of the components are disclosed along with FIG. 2.

Referring to FIG. 1, an image processing apparatus 100 in the present embodiment may perform image enhancement on a low-resolution input image so as to generate a super resolution output image. The image processing apparatus 100 may be an electronic device with an image processing feature such as a personal computer, a laptop computer, a tabular computer, a digital camera, a smart phone, a television, and so forth. The invention is not limited herein. The image processing apparatus 100 includes a storage unit 102 and a processing unit 104, where the functionalities thereof are as follows.

The storage unit 102 may be one or a combination of a stationary or mobile random access memory (RAM), a read-only memory (ROM), a flash memory, a hard drive or other similar devices. The storage unit 102 is configured to record a plurality of instructions executable by the processing unit 104, where the instructions may be loaded into the processing unit 104 for performing image enhancement on an input image.

The processing unit 30 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), other similar devices or a combination of aforementioned devices. The processing unit 104 is coupled to the storage unit 102 and capable of accessing and executing the instructions recorded in the storage unit 102.

Figure 2:
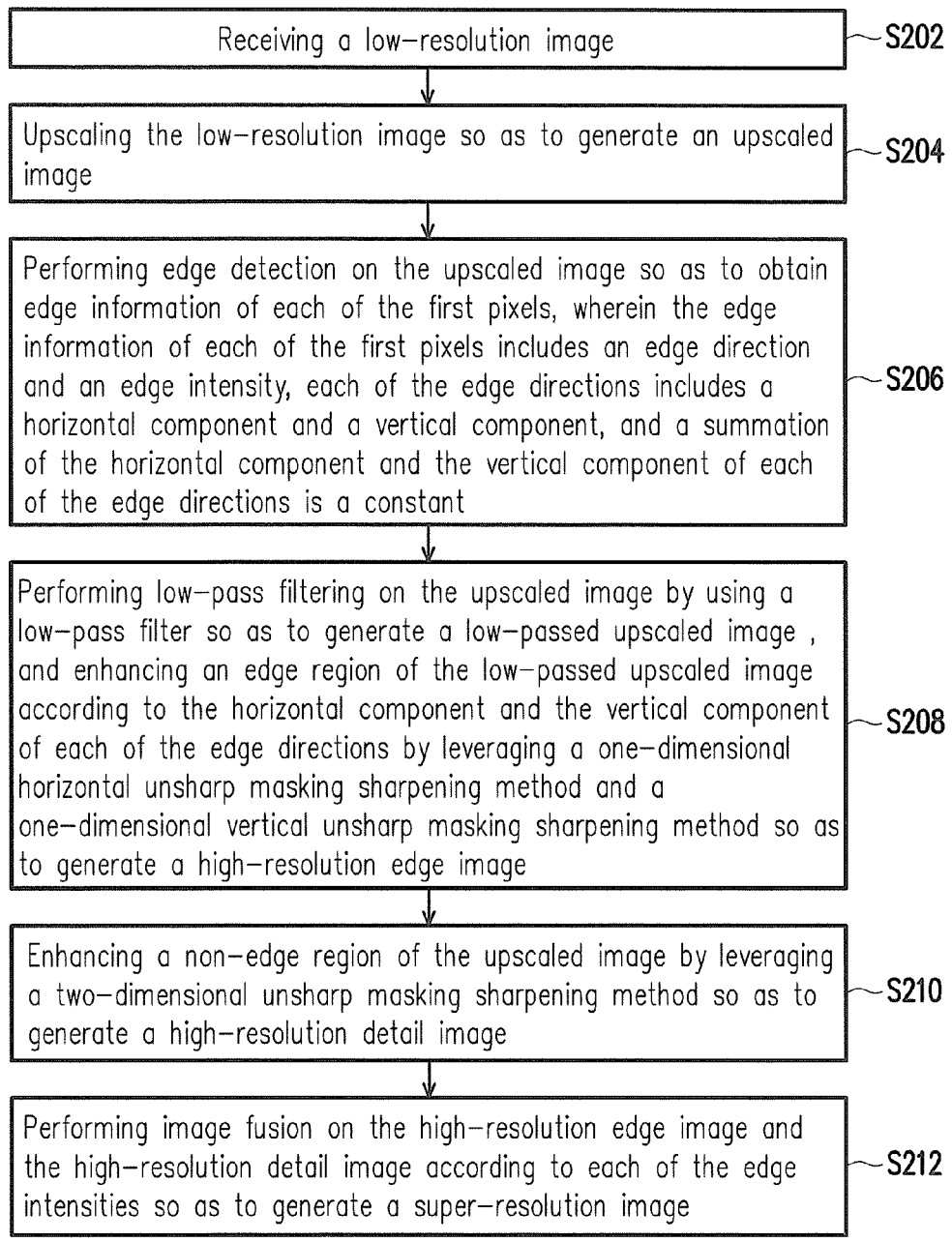
FIG. 2 illustrates a flowchart of a method for image enhancement according to an embodiment of the invention.

FIG. 2 illustrates a flowchart of a method for image enhancement according to an embodiment of the invention, and the method in FIG. 2 may be implemented by the image processing apparatus 100 in FIG. 1. The detailed steps of the method for image enhancement are illustrated along with the components of the image processing apparatus in the embodiments hereinafter.

Referring to FIG. 2, the processing unit 104 receives a low-resolution image (Step S202) and upscales the low-resolution image so as to generate an upscaled image (Step S204). To be specific, the processing unit 104 may interpolate and upscale the low-resolution image to the upscaled image by leveraging a bicubic interpolation method. The bicubic interpolation method is commonly adopted to scale images or videos, and it preserves more fine details and generates less interpolation artifacts than other interpolation methods. All pixels in the upscaled image are referred to as "first pixels", where the first pixels form a matrix with columns and rows.

Next, the processing unit 104 performs edge detection on the upscaled image so as to obtain edge information of each of the first pixels (Step S206). The edge information of each of the first pixels includes an edge direction and an edge intensity, where each of the edge directions includes a horizontal component and a vertical component. The details of Step S206 are described as follows.

The processing unit 104 may first calculate a horizontal gradient and a vertical gradient of each of the first pixels by using an edge-detection filter. In the present embodiment, the edge detection filter may be a Sobel operator commonly used in edge detection. The Sobel operator includes a matrix Sbx corresponding to a horizontal direction and a matrix Sby corresponding to a vertical direction, where $$Sbx = \frac{1}{8}\begin{bmatrix} -1 & 0 & 1 \\ -2 & 0 & 2 \\ -1 & 0 & 1 \end{bmatrix} \text{ and } Sby = \frac{1}{8}\begin{bmatrix} 1 & 2 & 1 \\ 0 & 0 & 0 \\ -1 & -2 & -1 \end{bmatrix}.$$

The processing unit 104 may obtain the horizontal gradient and the vertical gradient of each of the first pixels according to Eq. (1):

$$\begin{cases} Gx = Sbx * I \\ Gy = Sby * I \end{cases} \qquad \text{Eq. (1)}$$

where Gx represents the horizontal gradient of each of the first pixels, Gy represents the vertical gradient of each of the first pixels, I represents the upscaled image formed by the first pixels, and (*) denotes a convolution operator. Next, the processing unit 104 may obtain the edge direction and the edge intensity of each of the first pixels according to the horizontal gradient and the vertical gradient of each of the first pixels.

In terms of the edge directions, a ratio of the vertical gradient to the horizontal gradient of each of the first pixels is defined as "a gradient direction", which may be written as Eq. (2):

$$d = \frac{Gy}{Gx} \qquad \text{Eq. (2)}$$

where d, Gx, and Gy respectively represent the gradient direction, the horizontal gradient and the vertical gradient of each of the first pixels. On the other hand, in terms of the edge intensities, an absolute summation of the horizontal gradient and the vertical gradient of each of the first pixels is defined as "a gradient intensity", which may be written as Eq. (3):

$$m = |Gx| + |Gy| \qquad \text{Eq. (3)}$$

where m represents the gradient intensity. The gradient direction d and the gradient intensity m herein are referred to as arguments for conventional edge detection.

However, for each of the edge directions, the processing unit 104 may calculate an absolute ratio corresponding to the horizontal gradient and the vertical gradient of each of the first pixels and normalize each of the absolute ratios by a transfer function to respectively form a normalized direction intensity so that a summation of the horizontal component and the vertical component of the edge directions of each of the first pixels may be a constant. Hence, the processing unit 104 may only set one of the horizontal component and the vertical component as the edge direction of each of the first pixels. In other words, the edge direction may be simplified, where only one of the components is used to represent the complete edge direction information.

More concretely, in the present embodiment, the processing unit 104 may decompose the gradient direction d of each of the first pixels into the horizontal component of the edge direction Edx and the vertical component of the edge direction Edy according to Eq. (4):

$$\begin{cases} Edx = \frac{|Gx|}{|Gx|+|Gy|}, Edy = \frac{|Gy|}{|Gx|+|Gy|} = 1 - Edx & \text{if } |Gx|+|Gy| \neq 0 \\ Edx = 0, Edy = 1 & \text{if } |Gx|+|Gy| = 0 \end{cases} \qquad \text{Eq. (4)}$$

where Edx and Edy respectively represent the horizontal and vertical direction percentage of the gradient direction d. The processing unit 104 may accordingly use the horizontal component and the vertical component of the edge direction of each of the first pixels as the arguments for edge detection.

In an embodiment, the processing unit 104 may perform low-pass filtering on the horizontal component of the edge direction of each of the first pixels by using a low-pass filter so as to smooth out the horizontal component of the edge direction and generate a low-pass horizontal component of the edge direction of each of the first pixels. The low-pass filter herein may be a Gaussian blur filter, a mean filter, or other types of low-pass filters. The invention is not limited herein. Next, the processing unit 104 may obtain a low-pass vertical component of each of the edge directions according to the corresponding low-pass horizontal component, and set the low-pass horizontal component and the low-pass vertical component of the edge direction of each of the first pixels respectively as the horizontal component and the vertical component of the edge direction of each of the first pixels.

On the other hand, for the edge intensities, the processing unit 104 may first calculate an absolute summation of the horizontal gradient and the vertical gradient of each of the first pixels and normalize each of the absolute summations by a transfer function so as to obtain the edge intensity of each of the first pixels as another argument for edge detection. The horizontal gradients and the vertical gradients are both considered in such argument so that the edge intensities may show continuous variation. Accordingly, edge detection may not be affected by noises and may provide stable results.

More concretely, in the present embodiment, the processing unit 104 may obtain the edge intensity of each of the first pixels according to Eq. (5):

$$Ei = Eif(m, Ei_{cor}, Ei_{th}), \qquad \text{Eq. (5)}$$

$$\text{where } Eif: \begin{cases} Ei = 0, m \leq Ei_{cor} \\ Ei = \frac{m - Ei_{cor}}{Ei_{th} - Ei_{cor}}, Ei_{cor} < m < Ei_{th} \\ Ei = 1, m \geq Ei_{th} \end{cases}$$

where Ei represents the normalized edge intensity of each of the first pixels remapped to [0,1] by the transfer function $\text{Eif}(m, \text{Ei}_{cor}, \text{Ei}_{th})$, $\text{Ei}_{cor}$ represents a coring value corresponding to the lower bound of the gradient intensity m, and $\text{Ei}_{th}$ represents a threshold value corresponding to the upper bound of the gradient intensity m.

Figure 3A:
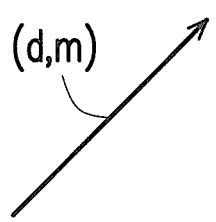
FIG. 3(a) illustrates a schematic diagram of conventional edge information.
Figure 3B:
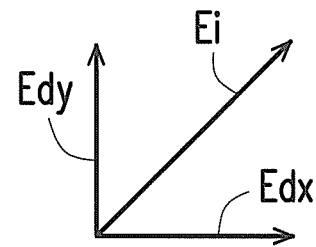
FIG. 3(b) illustrates a schematic diagram of normalized edge information according to an embodiment of the invention.

In short, FIG. 3(a) illustrates conventional edge information including the gradient direction d and the gradient intensity m. The processing unit 104 may convert gradient information E(d,m) to edge information being normalized $E_{nc}(\text{Edx}, \text{Ei})$ as illustrated in FIG. 3(b), where the edge information includes the horizontal component Edx and the vertical component Edy of the edge direction as well as the edge intensity Ei.

Revisiting FIG. 2, the processing unit 104 performs low-pass filtering on the upscaled image by using a low-pass filter so as to generate a low-passed upscaled image and enhances an edge region of the low-passed upscaled image according to the horizontal component and the vertical component of each of the edge directions by leveraging a one-dimensional horizontal unsharp masking sharpening method and a one-dimensional vertical unsharp masking sharpening method so as to generate a high-resolution edge image (Step S208). The low-pass filter used by the processing unit 104 herein may also be a Gaussian blur filter, a mean filter, or other types of low-pass filters. The invention is not limited herein. The processing unit 104 may further generate clear edges by using a directional high-pass filter.

To be specific, the processing unit 104 may perform low-pass filtering on the upscaled image by using the low-pass filter to generate the low-passed upscaled image with low noises. Next, the processing unit 104 may set the horizontal component and the vertical component of the edge direction of each of the first pixels obtained in Step S206 as a horizontal weight corresponding to a horizontal unsharp mask and a vertical weight corresponding to a vertical unsharp mask. The processing unit 104 may then enhance the edge region of the low-passed upscaled image according to the horizontal unsharp mask, the vertical unsharp mask, each of the horizontal weights, and each of the vertical weights so as to generate an edge-enhanced image. More concretely, the processing unit 104 may generate the edge-enhanced image according to Eq. (6):

$$I_{ed} = I + Edx \times (S_{umsx} * I) + Edy \times (S_{umsy} * I) \qquad \text{Eq. (6)}$$

where $I_{ed}$ represents the edge-enhanced image, $S_{umsx}$ represents the one-dimensional horizontal unsharp mask and may be, for example, $[-1,2,-1]$, and $S_{umsy}$ represents the one-dimensional vertical unsharp mask and may be, for example, $[-1,2,-1]^T$.

In the present embodiment, in order to smooth out the edge region of the edge-enhanced image without blurring details in the non-edge region, the processing unit 104 may perform image clipping on the edge region of the edge-enhanced image according to each of the edge intensities so as to generate the high-resolution edge image. More concretely, in the present embodiment, the processing unit 104 may generate the high-resolution edge image according to Eq. (7):

$$I_{edcl}(I_{ed}) = \begin{cases} I_{ed} + (I_{max} - I_{ed}) \times Ei, & I_{ed} > I_{max} \\ I_{ed} + (I_{min} - I_{ed}) \times Ei, & I_{ed} < I_{min} \\ I, & \text{others} \end{cases} \qquad \text{Eq. (7)}$$

where $I_{max}$ represents a maximum pixel value in a neighboring region of the first pixel I(x,y) and may be written as $I_{max} = \max(I(x+i, y+j))$, $I_{min}$ represents a minimum pixel value in the neighboring region of the first pixel I(x,y) and may be written as $I_{min} = \min(I(x+i, y+j))$, $i,j = [-k, k]$, and $I_{edcl}$ represents the high-resolution edge image.

The processing unit 104 may use the horizontal and vertical high-pass filters along with the normalized edge direction information as well as the enhancement component in the horizontal and vertical direction dynamically determined by weighted combinations to generate the edge-enhanced image, and further perform image clipping on the edge region of the edge-enhanced image. As such, the issue of artifacts and jaggy on edge regions existing in the conventional unsharp masking sharpening method may be solved.

Next, the processing unit 104 enhances a non-edge region of the upscaled image by leveraging a two-dimensional unsharp masking sharpening method so as to generate a high-resolution detail image (Step S210). More concretely, the processing unit 104 may generate the high-resolution detail image according to Eq. (8):

$$I_{dt} = I + S_{dt} * I \qquad \text{Eq. (8)}$$

where $I_{dt}$ represents the high-resolution detail image, $S_{dt}$ represents a two-dimensional unsharp mask and may be, for example, $$\frac{1}{16} \times \begin{bmatrix} -1 & -1 & -1 \\ -1 & 8 & -1 \\ -1 & -1 & -1 \end{bmatrix}.$$

In other words, the processing unit 104 may obtain high-frequency information by using a two-dimensional non-directional high-pass filter on the non-edge region. Accordingly, the high-frequency details of the upscaled image may be effectively enhanced in vivid details while detail artifacts or distortion may be prevented.

It should be noted that, in the present embodiment, the processing unit 104 may first execute Step S208 to generate the high-resolution edge image and then execute Step S210 to generate the high-resolution detail image. In other embodiments, the processing unit 104 may first execute Step S210 followed by Step S208 or even execute the two steps concurrently. The invention is not limited herein.

Next, the processing unit 104 performs is image fusion on the high-resolution edge image and the high-resolution detail image according to each of the edge intensities so as to generate a super-resolution image (Step S212). To be specific, the processing unit 104 may specify the edge intensity of each of the first pixels as an argument. The processing unit 104 may first set each of the edge intensities as an edge intensity weight corresponding to the high-resolution edge image, and then obtain a corresponding non-edge intensity weight. Next, the processing unit 104 may perform image fusion on the high-resolution edge image and the high-resolution detail image by a fusion ratio of each of the edge intensity weights to the corresponding non-edge intensity weight so as to generate the super-resolution image. More concretely, the processing unit 104 may generate the super-resolution image according to Eq. (9):

$$I' = Ei \times I_{edcl} + (1 - Ei) \times I_{dt} \qquad \text{Eq. (9)}$$

where I' represents the super-resolution image, Ei represents each of the edge intensity weights, and (1−Ei) represents each of the non-edge intensity weights. The super-resolution image herein not only exhibits smooth and clear edges but also vivid details.

Figure 4:
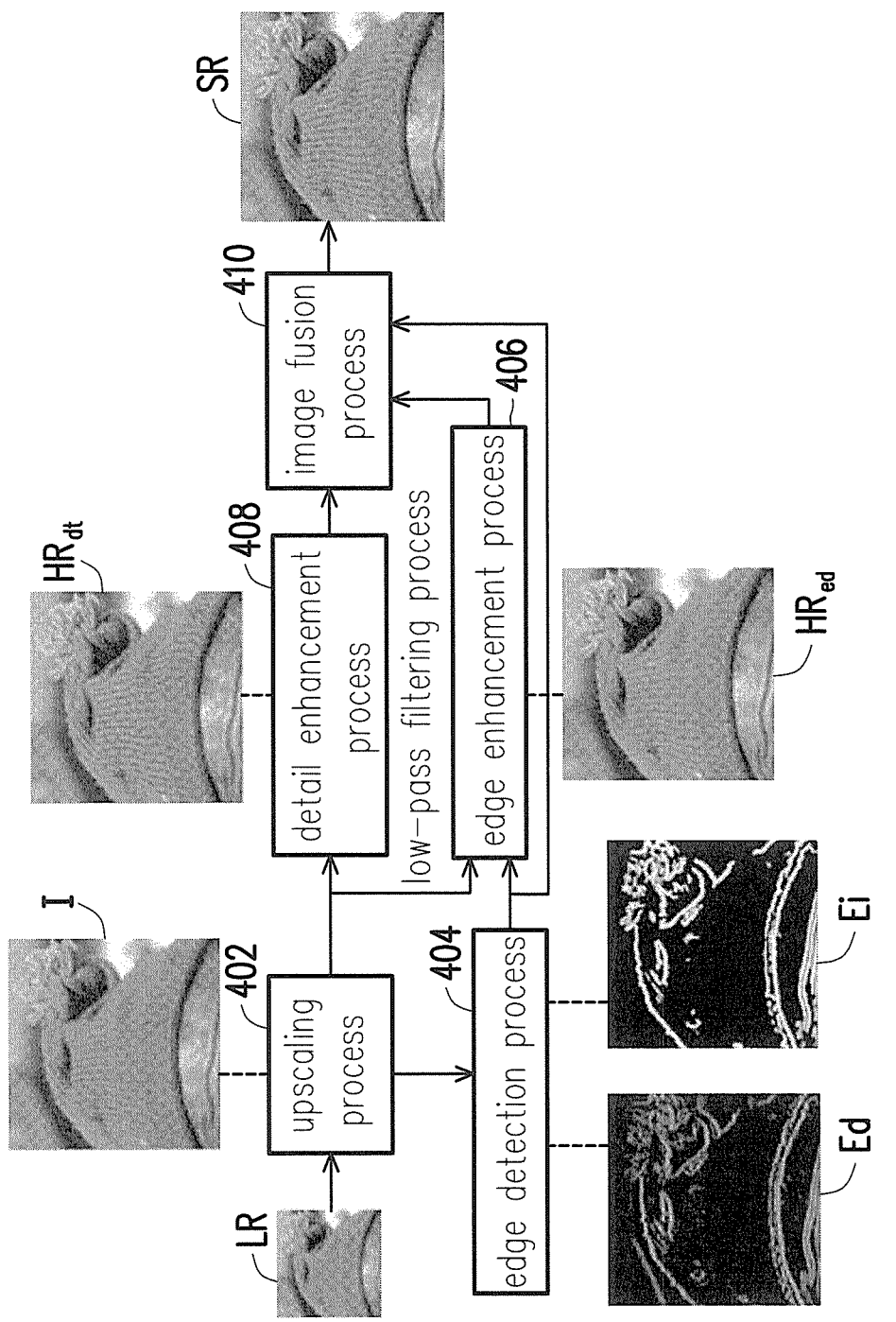
FIG. 4 illustrates a functional block diagram of an image enhancement method according to an embodiment of the invention.

The aforementioned image enhancement method may be summarized by FIG. 4 in terms of a functional block diagram according to an embodiment of the invention. Referring to FIG. 4, a low-resolution image LR is received as an input image, and an upscaling process 402 is performed on the low-resolution image LR so as to generate an upscaled image I. Edge information of the low-resolution image LR is obtained during an edge detection process 404, where the edge information includes edge directions Ed and edge intensities Ei. Next, a low-pass filtering process is performed on the upscaled image I, and an edge enhancement process 406 is performed on an edge region of the low-passed upscaled image so as to generate a high-resolution edge image $HR_{ed}$. Also, a detail enhancement process 408 is performed on a non-edge region of the upscaled image I so as to generate a high-resolution detail image $HR_{dt}$. An image fusion process 410 is performed on the high-resolution edge image $HR_{ed}$ and the high-resolution detail image $HR_{dt}$ so as to generate a super-resolution image SR.

The application further provides a computer-readable medium, which records a computer program to be loaded into an image processing apparatus to execute various steps of the aforementioned image enhancement method. The computer program is composed of a plurality of program instructions (for example, organization chart establishing program instructions, table approving program instructions, setting program instructions, and deployment program instructions). Steps of the image enhancement method may be implemented when these program instructions are loaded into the image processing apparatus and executed by the same.

In summary, the method, image processing apparatus, and computer readable medium for image enhancement provided in the invention use complete normalized edge direction and edge intensity information obtained from edge detection to generate a stable result. Horizontal and vertical high-pass filters along with the complete edge direction information may be used on an edge region for reproducing clear edges, and thus the issue of artifacts and jaggy on the edge region may be solved. A non-directional high-pass filter may be used on a non-edge region of the image for obtaining high-frequency information, and thus the high-frequency details of the upscaled image may be effectively enhanced in vivid details while detail artifacts or distortion may be prevented. A super-resolution image may be generated accordingly. Moreover, since the invention is implemented by a high-pass filter adopted as a kernel, high-frequency components in an image may be obtained in real-time without iterations and may be adjusted adaptively in terms of flexibility. Hence, while maintaining a single image without any additional frame buffer, the applicability of the image enhancement technique proposed in the invention is increased in practical application especially for consumer electronic products such as UHD LCD display integrated with a real-time chip.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for image enhancement, adapted to an image processing apparatus, comprising:
   receiving a low-resolution image;
   upscaling the low-resolution image so as to generate an upscaled image, wherein the upscaled image comprises a plurality of first pixels;
   performing edge detection on the upscaled image so as to obtain edge information of each of the first pixels, wherein the edge information of each of the first pixels comprises an edge direction and an edge intensity, each of the edge directions comprises a horizontal component and a vertical component, and a summation of the horizontal component and the vertical component of each of the edge directions is a constant;
   performing low-pass filtering on the upscaled image by using a low-pass filter so as to generate a low-passed upscaled image, and enhancing an edge region of the low-passed upscaled image according to the horizontal component and the vertical component of each of the edge directions by leveraging a one-dimensional horizontal unsharp masking sharpening method and a one-dimensional vertical unsharp masking sharpening method so as to generate a high-resolution edge image;
   enhancing a non-edge region of the upscaled image by leveraging a two-dimensional unsharp masking sharpening method so as to generate a high-resolution detail image; and
   performing image fusion on the high-resolution edge image and the high-resolution detail image according to each of the edge intensities so as to generate a super-resolution image.

2. The method according to claim 1, wherein the step of upscaling the low-resolution image so as to generate the upscaled image comprises:
   interpolating and upscaling the low-resolution image by leveraging a bicubic interpolation method so as to generate the upscaled image.

3. The method according to claim 1, wherein the step of performing edge detection on the upscaled image so as to obtain the edge information of each of the first pixels comprises:
   calculating a horizontal gradient and a vertical gradient of each of the first pixels by using an edge-detection filter;
   calculating and normalizing an absolute summation of the horizontal gradient and the vertical gradient of each of the first pixels respectively so as to obtain the edge intensity of each of the first pixels; and
   calculating and normalizing an absolute ratio corresponding to the horizontal gradient and the vertical gradient of each of the first pixels so as to obtain the horizontal component and the vertical component of the edge direction of each of the first pixels.

4. The method according to claim 3, wherein after the step of calculating and normalizing the absolute ratio corresponding to the horizontal gradient and the vertical gradient of each of the first pixels so as to obtain the horizontal component and the vertical component of the edge direction of each of the first pixels, the method further comprises:
   performing low-pass filtering on the horizontal component of the edge direction of each of the first pixels by using another low-pass filter so as to generate a low-pass horizontal component of the edge direction of each of the first pixels;
   obtaining a low-pass vertical component of the edge direction of each of the first pixels according to the low-pass horizontal component of the edge direction of each of the first pixels; and setting the low-pass horizontal component and the low-pass vertical component of the edge direction of each of the first pixels respectively as the horizontal component and the vertical component of the edge direction of each of the first pixels.

5. The method according to claim 1, wherein the step of enhancing the edge region of the low-passed upscaled image according to the horizontal component and the vertical component of each of the edge directions by leveraging the one-dimensional horizontal unsharp masking sharpening method and the one-dimensional vertical unsharp masking sharpening method so as to generate the high-resolution edge image comprises:

setting the horizontal component of each of the edge directions as a horizontal weight corresponding to a horizontal unsharp mask;

setting the vertical component of each of the edge directions as a vertical weight corresponding to a vertical unsharp mask;

enhancing the edge region of the low-passed upscaled image according to the horizontal unsharp mask, the vertical unsharp mask, each of the horizontal weights, and each of the vertical weights so as to generate an edge-enhanced image; and performing image clipping on the edge-enhanced image according to each of the edge intensities so as to generate the high-resolution edge image.

6. The method of claim 1, wherein the step of performing image fusion on the high-resolution edge image and the high-resolution detail image according to each of the edge intensities so as to generate the super-resolution image comprises:

setting each of the edge intensities as an edge intensity weight corresponding to the high-resolution edge image;

obtaining a corresponding non-edge intensity weight according to each of the edge intensity weights; and performing image fusion on the high-resolution edge image and the high-resolution detail image by a fusion ratio of each of the edge intensity weight to the corresponding non-edge intensity weight so as to generate the super-resolution image.

7. An image processing apparatus comprising:
a storage unit, storing a plurality of instructions; and
a processing unit, coupled to the storage unit, accessing and executing the instructions for:
  receiving a low-resolution image;
  upscaling the low-resolution image so as to generate an upscaled image, wherein the upscaled image comprises a plurality of first pixels;
  performing edge detection on the upscaled image so as to obtain edge information of each of the first pixels, wherein the edge information of each of the first pixels comprises an edge direction and an edge intensity, each of the edge directions comprises a horizontal component and a vertical component, and a summation of the horizontal component and the vertical component of each of the edge directions is a constant;
  performing low-pass filtering on the upscaled image by using a low-pass filter so as to generate a low-passed upscaled image, and enhancing an edge region of the low-passed upscaled image according to the horizontal component and the vertical component of each of the edge directions by leveraging a one-dimensional horizontal unsharp masking sharpening method and a one-dimensional vertical unsharp masking sharpening method so as to generate a high-resolution edge image;
  enhancing a non-edge region of the upscaled image by leveraging a two-dimensional unsharp masking sharpening method so as to generate a high-resolution detail image; and
  performing image fusion on the high-resolution edge image and the high-resolution detail image according to each of the edge intensities so as to generate a super-resolution image.

8. The image processing apparatus of claim 7, wherein the processing unit executes the instruction for upscaling the low-resolution image so as to generate the upscaled image comprising:

interpolating and upscaling the low-resolution image by leveraging a bicubic interpolation method so as to generate the upscaled image.

9. The image processing apparatus of claim 7, wherein the processing unit executes the instruction for performing edge detection on the upscaled image so as to obtain the edge information of each of the first pixels comprising:

calculating a horizontal gradient and a vertical gradient of each of the first pixels by using an edge-detection filter;

calculating and normalizing an absolute summation of the horizontal gradient and the vertical gradient of each of the first pixels respectively so as to obtain the edge intensity of each of the first pixels; and calculating and normalizing an absolute ratio corresponding to the horizontal gradient and the vertical gradient of each of the first pixels so as to obtain the horizontal component and the vertical component of the edge direction of each of the first pixels.

10. The image processing apparatus of claim 9, wherein after the processing unit executes the instruction for calculating and normalizing the absolute ratio corresponding to the horizontal gradient and the vertical gradient of each of the first pixels so as to obtain the horizontal component and the vertical component of the edge direction of each of the first pixels, the processing unit further executes another instruction for:

performing low-pass filtering on the horizontal component of the edge direction of each of the first pixels by using another low-pass filter so as to generate a low-pass horizontal component of the edge direction of each of the first pixels;

obtaining a low-pass vertical component of the edge direction of each of the first pixels according to the low-pass horizontal component of the edge direction of each of the first pixels; and setting the low-pass horizontal component and the low-pass vertical component of the edge direction of each of the first pixels respectively as the horizontal component and the vertical component of the edge direction of each of the first pixels.

11. The image processing apparatus of claim 7, wherein the processing unit executes the instruction for enhancing the edge region of the low-passed upscaled image according to the horizontal component and the vertical component of each of the edge directions by leveraging the one-dimensional horizontal unsharp masking sharpening method and the one-dimensional vertical unsharp masking sharpening method so as to generate the high-resolution edge image comprising:

setting the horizontal component of each of the edge directions as a horizontal weight corresponding to a horizontal unsharp mask;

setting the vertical component of each of the edge directions as a vertical weight corresponding to a vertical unsharp mask;

enhancing the edge region of the low-passed upscaled image according to the horizontal unsharp mask, the vertical unsharp mask, each of the horizontal weights, and each of the vertical weights so as to generate an edge-enhanced image; and performing image clipping on the edge-enhanced image according to each of the edge intensities so as to generate the high-resolution edge image.

12. The image processing apparatus of claim 7, wherein the processing unit executes the instruction for performing image fusion on the high-resolution edge image and the high-resolution detail image according to each of the edge intensities so as to generate the super-resolution image comprising:

setting each of the edge intensities as an edge intensity weight corresponding to the high-resolution edge image;

obtaining a corresponding non-edge intensity weight according to each of the edge intensity weights; and performing image fusion on the high-resolution edge image and the high-resolution detail image by a fusion ratio of each of the edge intensity weight to the corresponding non-edge intensity weight so as to generate the super-resolution image.

13. A non-transitory computer readable medium, recording programs to be loaded into an image processing apparatus to perform steps of:

receiving a low-resolution image;

upscaling the low-resolution image so as to generate an upscaled image, wherein the upscaled image comprises a plurality of first pixels;

performing edge detection on the upscaled image so as to obtain edge information of each of the first pixels, wherein the edge information of each of the first pixels comprises an edge direction and an edge intensity, each of the edge directions comprises a horizontal component and a vertical component, and a summation of the horizontal component and the vertical component of each of the edge directions is a constant;

performing low-pass filtering on the upscaled image by using a low-pass filter so as to generate a low-passed upscaled image, and enhancing an edge region of the low-passed upscaled image according to the horizontal component and the vertical component of each of the edge directions by leveraging a one-dimensional horizontal unsharp masking sharpening method and a one-dimensional vertical unsharp masking sharpening method so as to generate a high-resolution edge image;

enhancing a non-edge region of the upscaled image by leveraging a two-dimensional unsharp masking sharpening method so as to generate a high-resolution detail image; and performing image fusion on the high-resolution edge image and the high-resolution detail image according to each of the edge intensities so as to generate a super-resolution image.

* * * * *